US011258330B2

(12) United States Patent
Ueno et al.

(10) Patent No.: US 11,258,330 B2
(45) Date of Patent: Feb. 22, 2022

(54) ROTATING ELECTRICAL DEVICE

(71) Applicants: KYB CORPORATION, Tokyo (JP); TOP CO., LTD., Fukui (JP)

(72) Inventors: Sayaka Ueno, Tokyo (JP); Hiroyuki Miyoshi, Fukui (JP)

(73) Assignees: KYB CORPORATION, Tokyo (JP); TOP CO., LTD., Fukui (JP)

( * ) Notice: Subject to any disclaimer, the term of this patent is extended or adjusted under 35 U.S.C. 154(b) by 60 days.

(21) Appl. No.: 16/701,719

(22) Filed: Dec. 3, 2019

(65) Prior Publication Data

US 2020/0195083 A1 Jun. 18, 2020

(30) Foreign Application Priority Data

Dec. 18, 2018 (JP) .............................. JP2018-236750

(51) Int. Cl.
*H02K 5/173* (2006.01)
*H02K 7/08* (2006.01)
*H02K 3/52* (2006.01)

(52) U.S. Cl.
CPC ........... *H02K 5/1732* (2013.01); *H02K 3/522* (2013.01); *H02K 7/083* (2013.01); *H02K 2203/09* (2013.01)

(58) Field of Classification Search
CPC ...... H02K 5/1732; H02K 7/083; H02K 3/522; H02K 2203/09; H02K 3/50; H02K 5/161
See application file for complete search history.

(56) References Cited

U.S. PATENT DOCUMENTS

| 2016/0294248 | A1* | 10/2016 | Atarashi ................. H02K 5/16 |
| 2018/0248438 | A1 | 8/2018 | Ogawa et al. |
| 2019/0229577 | A1 | 7/2019 | Sambuichi et al. |
| 2020/0244141 | A1 | 7/2020 | Sambuichi et al. |
| 2021/0143708 | A1* | 5/2021 | Hattori ................. H02K 7/083 |

FOREIGN PATENT DOCUMENTS

| WO | WO 2017/026492 A1 | 2/2017 |
| WO | WO 2018/016571 A1 | 1/2018 |

OTHER PUBLICATIONS

Nov. 1, 2021, Chinese Office Action issued for related CN application No. 201911256112.2.

* cited by examiner

*Primary Examiner* — Tulsidas C Patel
(74) *Attorney, Agent, or Firm* — Paratus Law Group, PLLC

(57) ABSTRACT

The rotating electrical device has a motor, a bearing holder, and a busbar unit. The busbar unit has a plurality of busbars, and an electrically insulating busbar holder enclosing the plurality of busbars. The plurality of busbars are electrically connected to the plurality of coils, respectively, and inserted, on the bearing holder side of the busbar holder, through each of the plurality of terminal through-holes in the bearing holder, and the busbar holder is configured to enclose the periphery of a part where the plurality of busbars are inserted through the terminal through-holes.

6 Claims, 7 Drawing Sheets

ROTATING ELECTRICAL DEVICE

CROSS REFERENCE TO PRIOR APPLICATION

This application claims priority to Japanese Patent Application No. 2018-236750 (filed on Dec. 18, 2018), which is hereby incorporated by reference in its entirety.

BACKGROUND

Technical Field

The present invention relates to a rotating electrical device and more particularly relates to a rotating electrical device such as a motor including a busbar unit and a bearing holder.

Related Art

As a rotating electrical device such as a motor, there is a structure in which a busbar, which includes a power supply terminal for supplying electricity to a stator coil, passes through a through-hole provided in a bearing holder holding a bearing rotatably in a casing, and is connected between a circuit board used to control the supply of electricity, and a busbar unit. In a rotating electrical device with this kind of configuration, it is necessary to insulate the inner surface of the through-hole in the bearing holder and the surface of the busbar in order to prevent a short circuit caused by electrical contact between the metal bearing holder and the busbar.

In the motor disclosed in WO 2017/026492 (A1) (see 0074 and FIG. 10), a member having an insulated terminal holding portion formed of an insulating material which covers the passage section of the busbar through-hole is attached to the busbar unit in order to avoid electrical contact between the inner surface of the bearing holder through-hole and the surface of the busbar.

SUMMARY

However, an insulated structure as described above leads to an increased number of components due to the addition of a separate member formed of an insulating material and an increase in the manufacturing steps due to the additional work of incorporating this component.

In view of the foregoing issue, an object of the present invention is to provide a rotating electrical device with which it is possible to secure insulation between the busbar and bearing holder more reliably and by means of a lower cost structure.

In order to achieve the foregoing object, a rotating electrical device according to one embodiment of the present invention includes a rotor; a stator; a bearing holder; and a busbar unit.

The rotor has a shaft.

The stator is disposed opposite the rotor in a radial direction and has a plurality of coils.

The bearing holder supports a bearing supporting the shaft.

The busbar unit is disposed between the stator and the bearing holder.

The bearing holder has a plurality of terminal through-holes.

The busbar unit is configured having a plurality of busbars formed of a conductive material, and an electrically insulating busbar holder enclosing the plurality of busbars, wherein the plurality of busbars are electrically connected to the plurality of coils, respectively, and inserted through each of the plurality of terminal through-holes in the bearing holder, and wherein the busbar holder encloses the periphery of a part where the plurality of busbars are inserted through the terminal through-holes.

DETAILED DESCRIPTION

An embodiment of the present invention will be described hereinbelow with reference to the drawings.

<Electronic Device Configuration>

Figure 1:
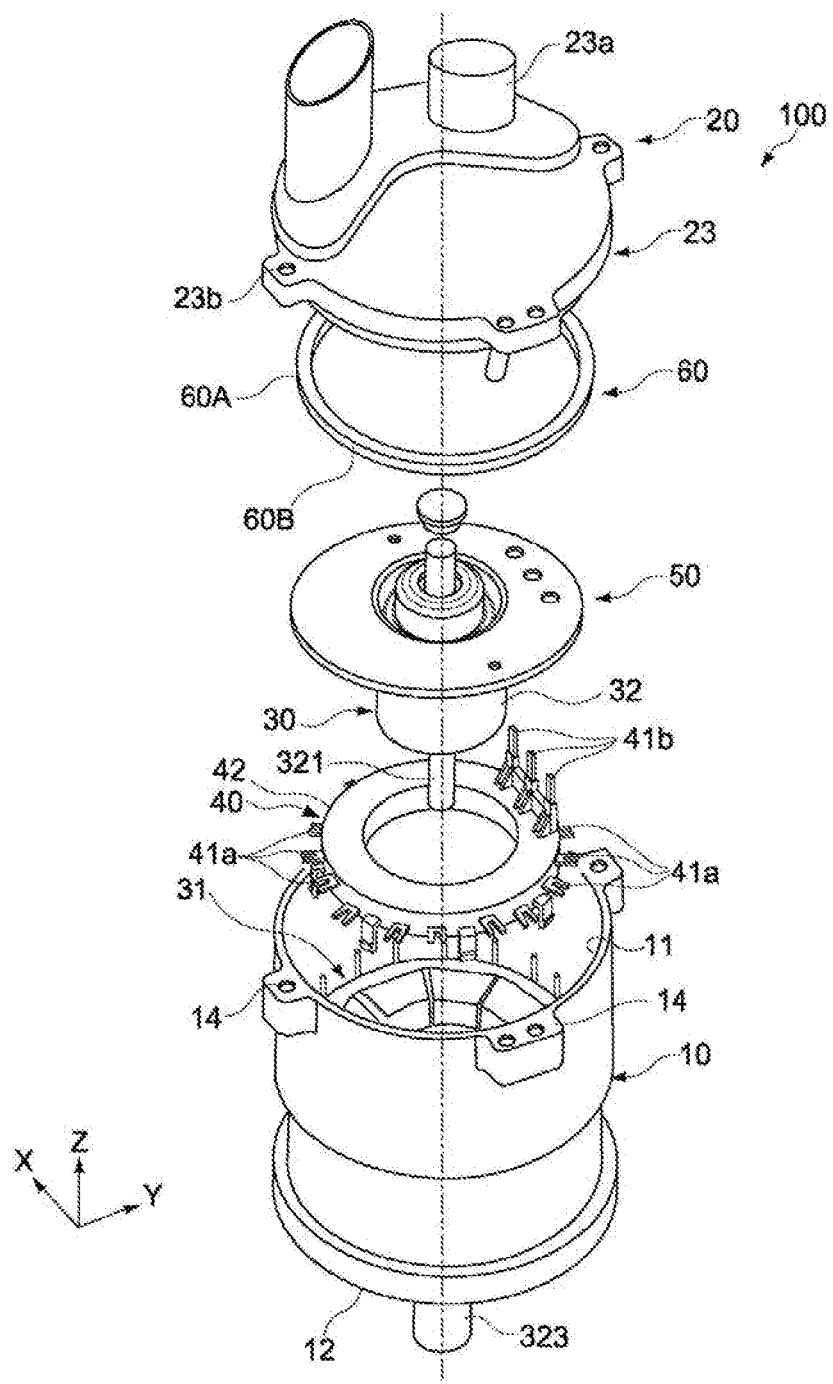
FIG. 1 is an exploded perspective view illustrating a configuration example of a rotating electrical device which is an electronic device according to one embodiment of the present invention.
Figure 2:
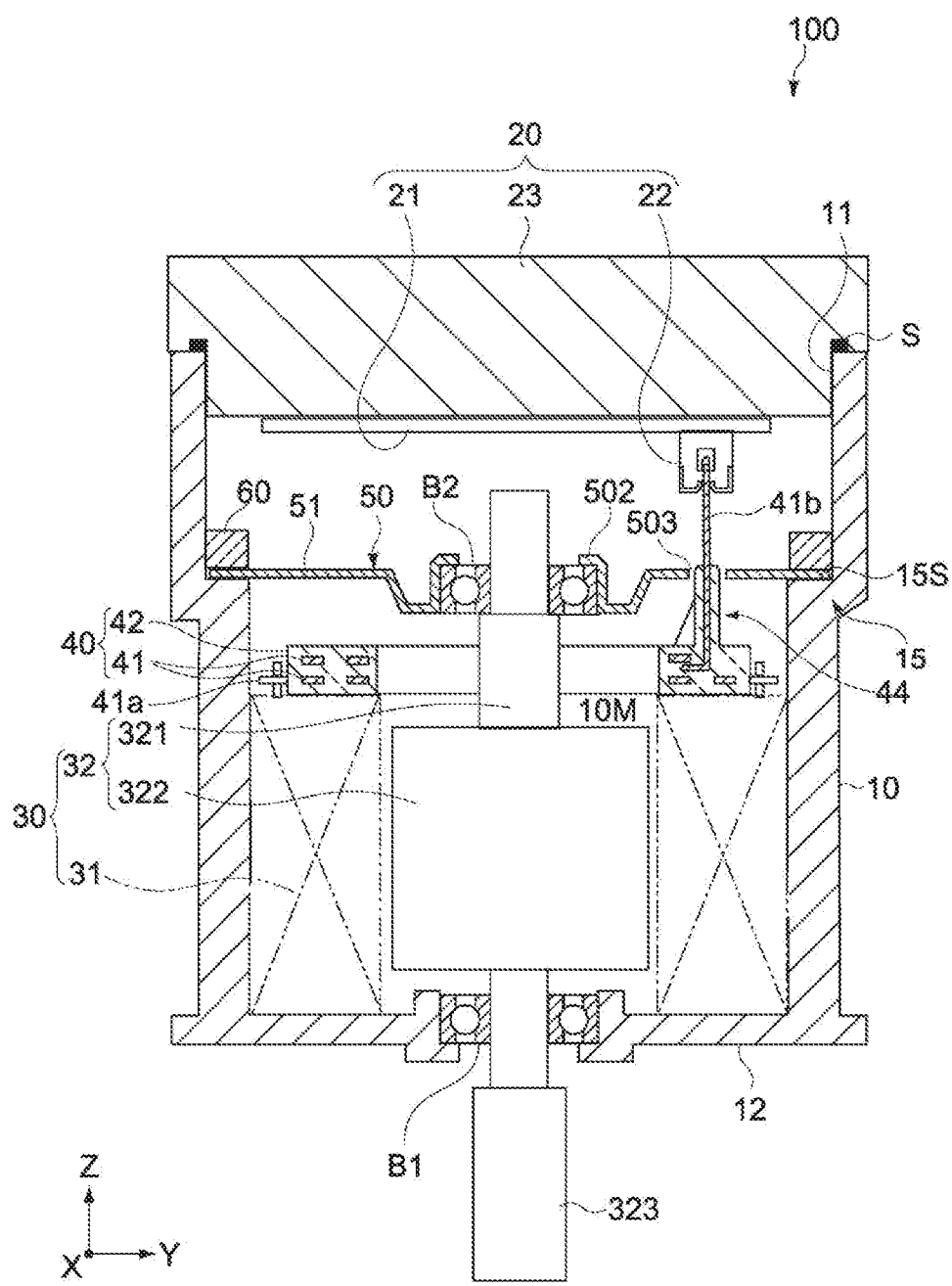
FIG. 2 is an essential part cross-sectional view of the rotating electrical device.

FIG. 1 is an exploded perspective view illustrating a configuration example of a rotating electrical device 100 which is an electronic device according to one embodiment of the present invention, and FIG. 2 is an essential part cross-sectional view of the rotating electrical device 100.

The rotating electrical device 100 has a casing 10, a component package 20, a motor 30, a busbar unit 40, and a bearing holder 50.

[Casing]

The casing 10 is formed with a cylinder-shaped (cylindrical) outline having an opening 11 and a bottom portion 12 opposite the opening 11. In view of its shape and costs, the casing 10 is configured from a metal material such aluminum die-cast or aluminum, and, as illustrated in FIG. 2, accommodates the component package 20, motor 30, busbar unit 40, bearing holder 50, and the like.

A step-shaped step portion 15 for preventing the bearing holder 50, which affords insertion via the opening 11, from falling in a Z axis (shaft 321) direction is formed between the bottom portion 12 and opening 11 (see FIG. 2).

The step portion 15 includes a first support face 15S opposite the opening 11. The first support face 15S supports the perimeter of the bearing holder 50, as will be described subsequently.

The casing 10 is provided between the bottom portion 12 and step portion 15 and has a motor chamber 10M (see FIG. 2) for accommodating the rotor 32, described subsequently.

[Component Package]

As illustrated in FIG. 2, the component package 20 is held at the top end of the casing 10 above the motor 30, busbar unit 40, and bearing holder 50. The component package 20 has a component mounting substrate 21 and a heat sink 23.

The component mounting substrate 21 of the present embodiment is a circuit board which includes various electronic devices (not illustrated) constituting an electronic control unit (ECU) of an electric power steering (EPS) apparatus. The electronic devices include a central processing unit (CPU), a memory, and the like. The component mounting substrate 21 is fixed to a heat sink 23 via a plurality of screw portions (not illustrated).

The heat sink 23 constitutes a lid portion which hermetically seals the interior of the casing 10 by being fitted to the opening 11 in the casing 10 via a seal ring S (see FIG. 2). As illustrated in FIG. 1, an external connection terminal 23a, which electrically interconnects the component mounting substrate 21 and a power-supply unit which is not illustrated, protrudes from the heat sink 23. The perimeter of the heat sink 23 is provided with a plurality of brackets 23b having a screw insertion hole, and is fastened with screws to a plurality of fixing brackets 14 provided on the perimeter of the opening 11 in the heat sink 23 via the brackets 23b.

[Motor]

The motor 30 is accommodated in the motor chamber 10M in the casing 10 as illustrated in FIG. 2 and has a stator 31 and a rotor 32.

The stator 31 includes a plurality of teeth (stator cores) which are arranged in an annular shape inside the casing 10 and coils (stator coils) which are wound around each of the plurality of teeth. The teeth are formed of a magnetic material and configured from a laminated body of a plurality of magnetic, rigid sheets, for example. The stator 31 is fixed to the casing 10 by being fitted to the inner circumference of the casing 10. To form three-phase magnetic coils with a U phase, V phase and W phase, both ends (not illustrated) of the coils are electrically connected to the busbar unit 40.

The rotor 32 has a shaft 321 which rotates about an axis (Z axis), and a rotor core 322 which is attached to the shaft 321. The shaft 321 is disposed along the axial core of the casing 10 and press-fitted into a through-hole formed in the center of the rotor core 322. The shaft 321 is rotatably supported in the casing 10 via a bearing B1 and a bearing B2. The rotor core 322 has a plurality of magnetic poles arranged in a circumferential direction. The rotor 32 is disposed inside the stator 31 and causes the shaft 321 to rotate on its axis under electromagnetic action with the stator 31.

One end (the lower end in FIGS. 1 and 2) of the shaft 321 passes through the bottom portion 12 of the casing 10 and has a gear portion 323 at its tip. The gear portion 323 meshes with a mating gear (not illustrated) linked to the steering shaft and transmits the rotation of the shaft 321 to the steering shaft.

One bearing B1 is attached to the bottom portion 12 of the casing 10 and rotatably supports one end of the shaft 321. The other bearing B2 rotatably supports the other end of the shaft 321.

The bearing B2 is disposed between the rotor core 322 and the heat sink 23 and is fixed to the casing 10 via the bearing holder 50. The bearing holder 50 will be described in detail subsequently.

[Busbar Unit]

The busbar unit 40 has a plurality of busbars 41 formed of a conductive material and an electrically insulated busbar holder 42 which encloses the busbars 41 (see FIG. 2). The busbar holder 42 is configured from an annular molded body, and the plurality of busbars 41 include a plurality of connecting terminals 41a which protrude radially outward from the outer peripheral surface of the busbar holder 42, and a plurality of power supply terminals 41b which protrude in an axial direction from the top surface of the busbar holder 42 and which correspond to a U phase, V phase, and Z phase, respectively. The plurality of power supply terminals 41b are press-fit terminals which are electrically connected to a connector component 22 of the component mounting substrate 21. The busbar holder 42 is molded from an insulating material with electrical insulation properties such as synthetic resin, for example.

The busbar unit 40 is disposed inside the casing 10 and is connected to the stator coils concentrically with the shaft 321. The plurality of connecting terminals 41a are electrically connected to one end of the U-phase, V-phase and W-phase stator coils, respectively, and electrically connected to the connector component 22 mounted on the lower face of the component mounting substrate 21 (see FIG. 2).

[Press-Fit Ring]

The press-fit ring 60 is annular, as illustrated in FIG. 1. The press-fit ring 60 is press-fit via the opening 11 into the casing 10 so as to sandwich the bearing holder 50 in the Z axis direction in conjunction with the step portion 15.

The press-fit ring 60 is formed of the same material as the casing 10 (aluminum die-cast or aluminum, or the like) or a material with a linear expansion coefficient on the order of the casing 10 (brass or a magnesium alloy, for example). It is thus possible to prevent slack, when press-fitting and fixing the press-fit ring 60 to the bearing holder 50, which is caused by a temperature variation in the rotating electrical device 100.

[Bearing Holder]

Figure 3:
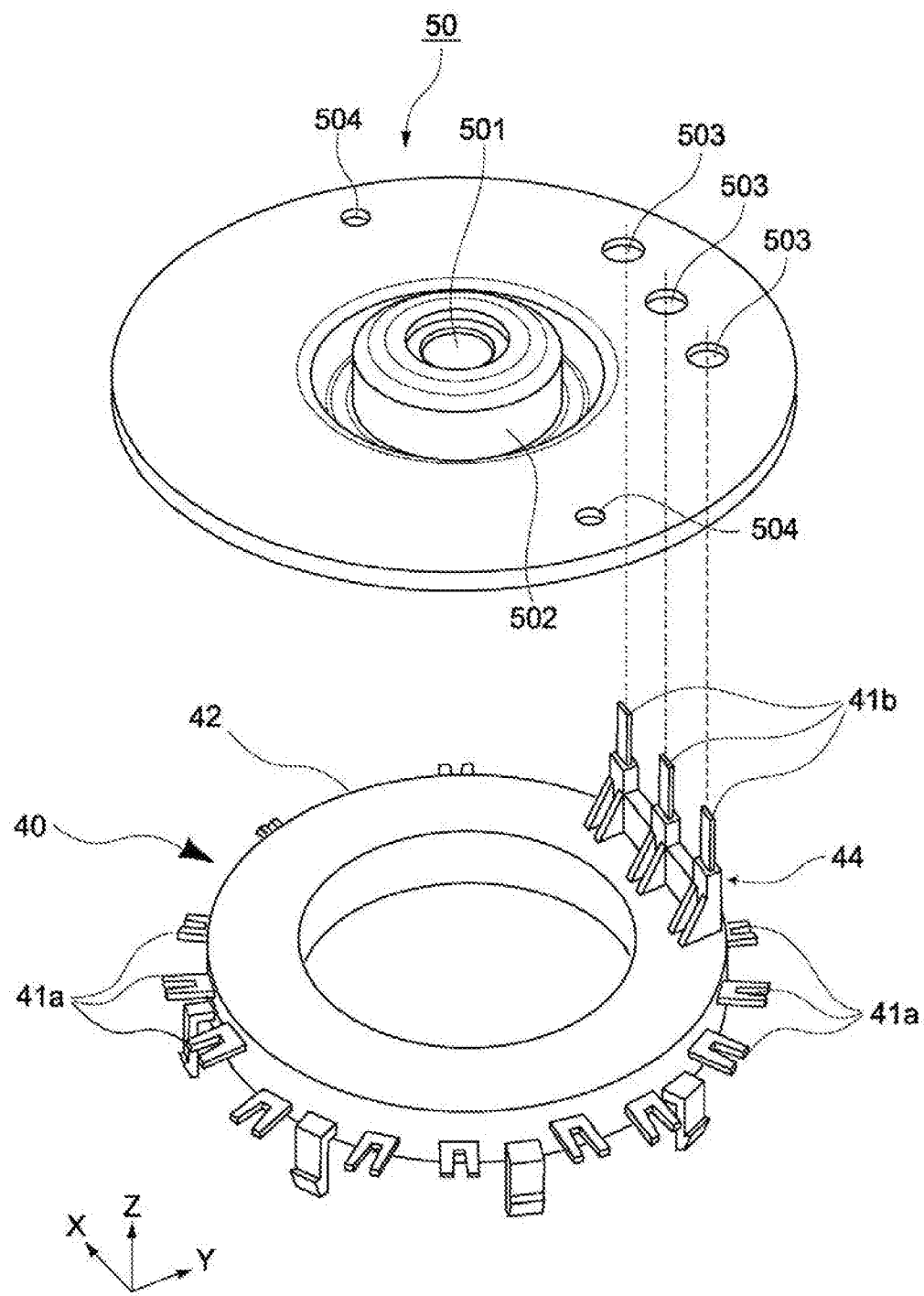
FIG. 3 is a perspective view illustrating a busbar unit and a bearing holder of the rotating electrical device.
Figure 4:
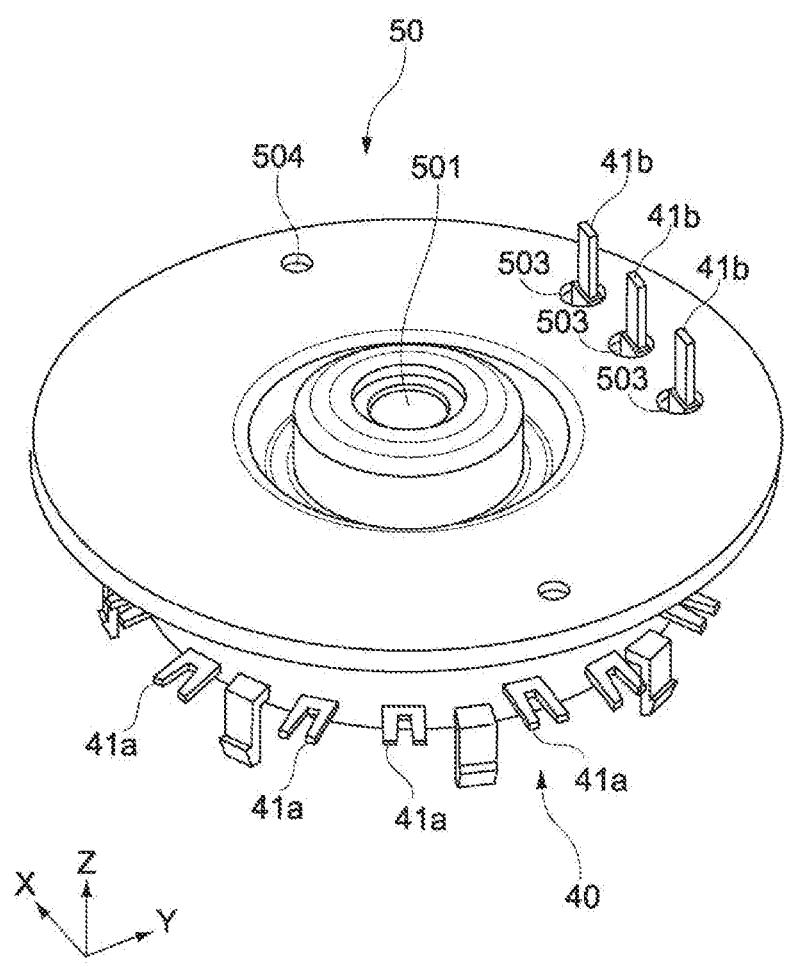
FIG. 4 is a perspective view of a state in which the busbar unit and the bearing holder are combined.

FIG. 3 is a perspective view illustrating the busbar unit 40 and the bearing holder 50, and FIG. 4 is a perspective view of a state in which the busbar unit 40 and the bearing holder 50 are combined.

The bearing holder 50 serves to align and hold bearing B2 (see FIG. 2) within the casing 10, and is configured from a metal-sheet press molding. The bearing holder 50 according to the present embodiment is manufactured by deep-drawing and bending a metallic plate into a solid body shape. As a result of the bearing holder 50 being configured by means of a metallic material, frictional heat generated by the bearing B2 can be allowed to escape efficiently to the casing 10 via the bearing holder 50, thereby improving the heat dissipation properties of the bearing B2.

The bearing holder 50 is broadly disc-shaped and provided in the center thereof is an axial hole 501 through which the shaft 321 passes. A bearing holding portion 502 for press-fitting and holding the bearing B2 is provided in order to surround the axial hole 501. The bearing holding portion 502 integrally holds the bearing B2 by means of a joining or fitting action with the outer race of the bearing B2. Here, an integral join with bearing B2 may also be obtained by caulking the open lower end portion of the bearing holding portion 502.

The bearing holder 50 further includes a plurality of terminal through-holes 503 for individually passing a plurality of power supply terminals 41b which are drawn in the axial direction (Z direction) from the busbar unit 40, and a plurality of ventilation holes 504. The ventilation holes 504 may also be holes for material-thinning purposes.

(Insulating Structure for Power Supply Terminals 41b)

The plurality of power supply terminals 41b protruding from the top surface of the busbar holder 42 of the busbar unit 40 pass through the terminal through-holes 503 provided in the bearing holder 50 and are electrically connected to the connector component 22 on the component mounting substrate 21. Here, the bearing holder 50 is configured from a metallic material. Therefore, an insulated structure which ensures electrical insulation between the inner surface of the terminal through-holes 503 and the surface of the power supply terminals 41*b* is adopted in order to prevent a short-circuit due to electrical contact therebetween.

Although an insulated structure in which at least the surface of the part of the power supply terminals 41*b* which passes through the terminal through-holes 503 is covered by a separate member formed of an insulating material, or the like, is typically considered, the addition of a separate member formed of such an insulating material and the increase in the number of components brings about an increase in manufacturing steps due to the additional work of incorporating this component, and higher manufacturing costs.

The busbar holder 42 of the busbar unit 40 includes the insulated terminal holding portion 44. In this embodiment, the insulated terminal holding portion 44, which encloses the part for securing electrical insulation of the part of the power supply terminals 41*b* passing through the terminal through-holes 503 in the bearing holder 50, is provided by being molded integrally with the busbar holder 42 of the busbar unit 40.

Figure 5:
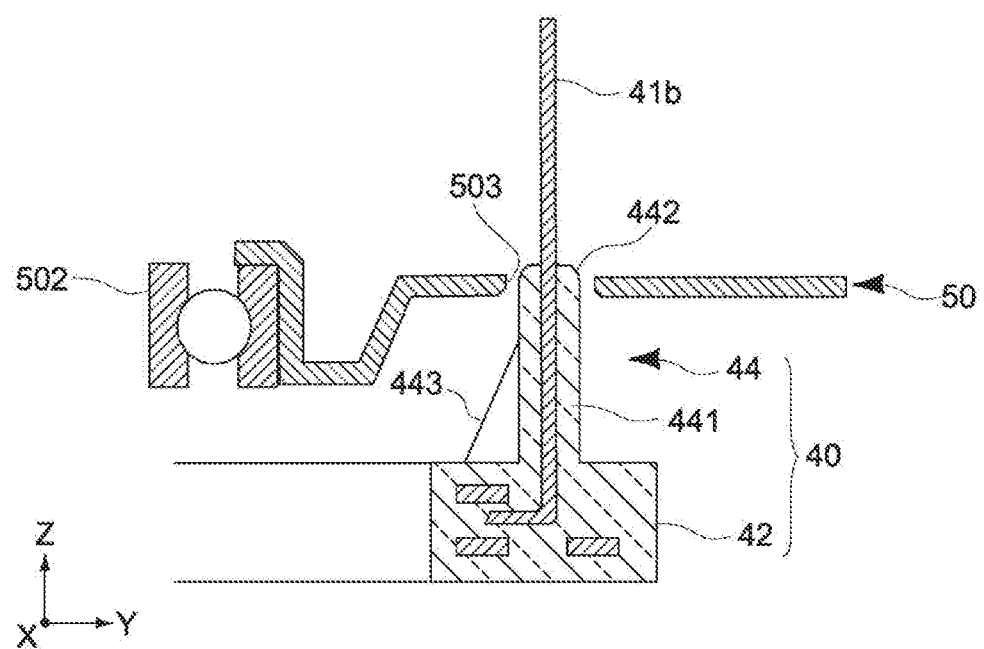
FIG. 5 is a cross-sectional view illustrating a configuration of an insulated terminal holding portion of the rotating electrical device.
Figure 6:
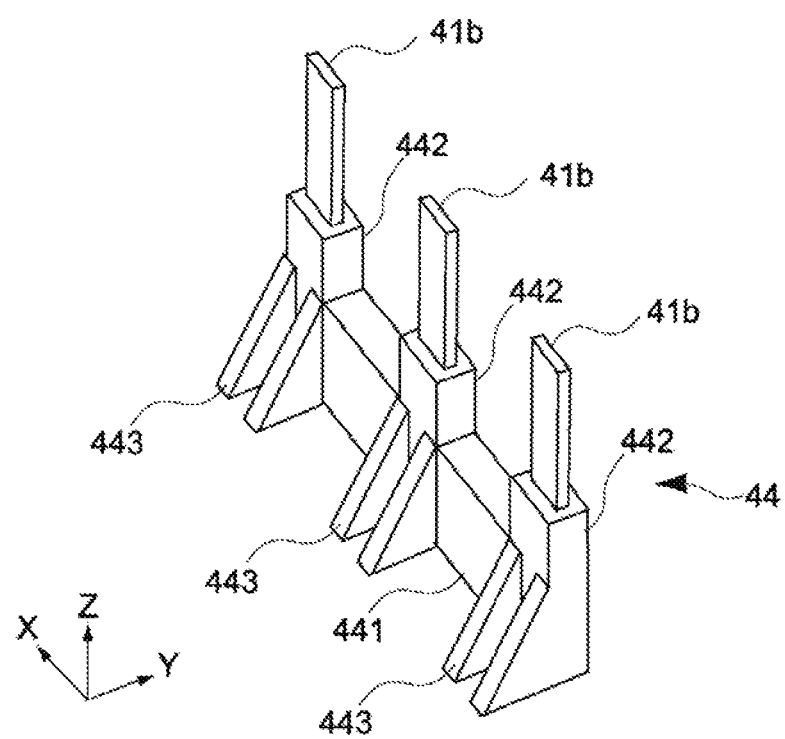
FIG. 6 is a perspective view of the insulated terminal holding portion of the rotating electrical device.

FIG. 5 is an enlarged cross-sectional view of the insulated terminal holding portion 44, and FIG. 6 is an enlarged perspective view of the insulated terminal holding portion 44. As illustrated in these drawings, the insulated terminal holding portion 44 includes a base portion 441, a plurality of insertion portions 442, and a plurality of reinforcing ribs 443.

The base portion 441 is a base portion of the insulated terminal holding portion 44. The insulated terminal holding portion 44 is a part of this base portion 441 and is integrated with the busbar holder 42 of the busbar unit 40.

The plurality of insertion portions 442 are parts which are formed for each of the power supply terminals 41*b* and which are pushed into or press-fit individually into the plurality of terminal through-holes 503 in the bearing holder 50, respectively. Therefore, insulation of the parts of the respective power supply terminals 41*b* that pass through the terminal through-holes 503 in the bearing holder 50 is ensured by using the insertion portions 442 which are insulators to prevent electrical contact between the surface of the power supply terminals 41*b* and the inner surface of the terminal through-holes 503.

In the present embodiment, because the insulated terminal holding portion 44 is molded integrally with the busbar holder 42, the number of components can be reduced in comparison with a structure in which a separate insulating component is attached to the busbar holder 42, thereby obviating the need for the work of attaching the separate insulating component to the busbar holder and thus enabling manufacturing costs to be curbed.

Moreover, in order for electrical contact between the surface of the power supply terminals 41*b* and the inner surface of the terminal through-holes 503 in the bearing holder 50 to be prevented more reliably, the tip of the insertion portions 442 of the insulated terminal holding portion 44 needs to be higher in height than the surface, on the component mounting substrate 21 side, of the bearing holder 50 in a state of assembly of the rotating electrical device 100. In the present embodiment, because the insulated terminal holding portion 44 is formed integrally with the busbar holder 42, conditions for the foregoing height relationship are ensured more reliably, and a highly reliable insulated structure is obtained. In other words, inconsistencies in insulation performance arising from the accuracy of attaching a separate insulating component is no longer generated, and stable insulation is ensured.

Note that, in the present embodiment, the shape of the terminal through-holes 503 is made circular and the shape of the power supply terminals 41*b* is made rectangular, thereby ensuring a margin for deviation in the rotation attitude about the Z axis of the power supply terminals 41*b*.

Incidentally, if there is a shift in the positional relationship between the plurality of terminal through-holes 503 in the bearing holder 50 and the plurality of insertion portions 442 of the insulated terminal holding portion 44, when the plurality of insertion portions 442 of the insulated terminal holding portion 44 have been inserted in the plurality of terminal through-holes 503, a large shear force is applied to the base part in particular of the insulated terminal holding portion 44, and there is a risk of the insulated terminal holding portion 44 being deformed and, worst case, broken, via the base, by each of the power supply terminals 41*b*.

In the present embodiment, the insulated terminal holding portion 44 is provided with reinforcing ribs 443 in order to prevent such deformation and breaking of the insulated terminal holding portion 44. The reinforcing ribs 443 are provided to enhance the shear strength in the molding shrinkage direction of the busbar holder 42 in view of the fact that the positional relationship between the plurality of terminal through-holes 503 in the bearing holder 50 and the plurality of insertion portions 442 of the insulated terminal holding portion 44 is most susceptible to a shift in the molding shrinkage direction (radial direction) of the busbar holder 42. More specifically, the reinforcing ribs 443 are formed so as to extend in a direction orthogonal to the plurality of insertion portions 442.

In addition, the insulated terminal holding portion 44 is formed to improve the shear strength not only in the molding shrinkage direction of the busbar holder 42 but also in a direction approximately orthogonal to the molding shrinkage direction. More specifically, in the insulated terminal holding portion 44, the plurality of insertion portions 442 individually holding each of the plurality of power supply terminals 41*b* are tied together in a direction approximately orthogonal to the molding shrinkage direction by means of the base portion 441 therebelow. Accordingly, a high shear strength is also obtained in a direction which is approximately orthogonal to the molding shrinkage direction.

Second Embodiment

A second embodiment of the present invention will be described next.

Figure 7:
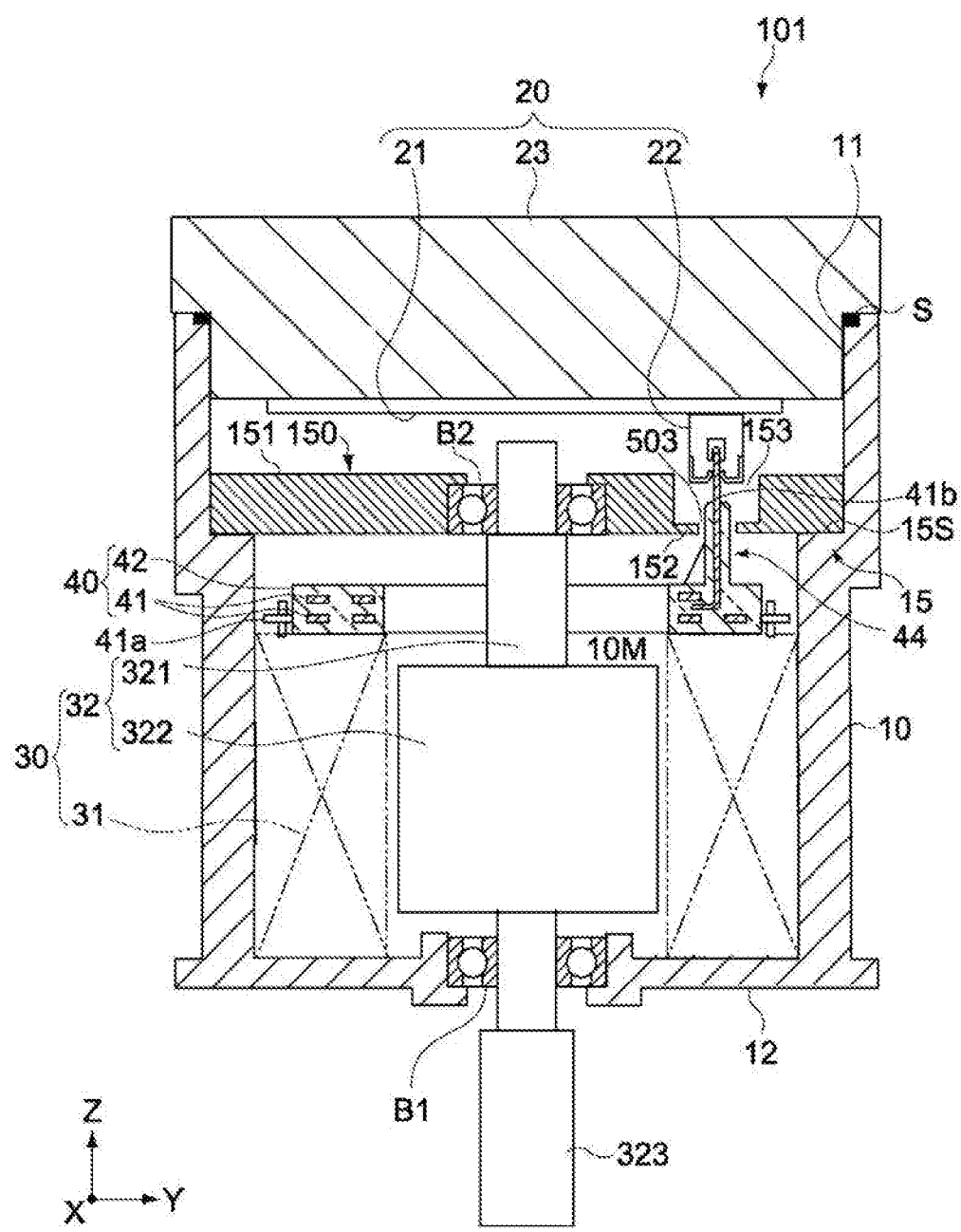
FIG. 7 is an essential part cross-sectional view of a rotating electrical device according to a second embodiment of the present invention.

FIG. 7 is an essential part cross-sectional views illustrating a configuration example of a rotating electrical device 101 which is an electronic device according to the second embodiment of the present invention.

Note that, in FIG. 7, the same reference signs have been assigned to the same parts as the rotating electrical device 100 according to the first embodiment, and a repetitive description thereof is omitted.

In the rotating electrical device 101 according to the present embodiment, the configuration of a bearing holder 150 in particular differs from the first embodiment. This bearing holder 150 does not employ a press-fit ring 60 as per the rotating electrical device 100 according to the first embodiment, and is press-fit inside the casing 10 in a state where the outer peripheral surface of the bearing holder 150 abuts the inner peripheral surface of the casing 10, and is installed on a support face 15S of a step portion 15 in the casing 10. The mating parts of the bearing holder 150 and casing 10 may be fixed more securely by means of adhesive.

This bearing holder 150 has a thick portion 151 which extends in an orthogonal direction to the shaft 321 and a thin portion 152 which is thinner in thickness than the thick portion 151. That is, except for the thin portion 152 at the periphery of the plurality of terminal through-holes 503, the bearing holder 150 is configured from the thick portion 151 which has a sufficiently large thickness in comparison with the bearing holder 50 of the rotating electrical device 100 according to the first embodiment. The thin portion 152 is formed by the remaining thin part near the busbar unit 40 as a result of forming a recess 153 which is open on the opposite side of the bearing holder 50 from the busbar unit 40, that is, on the component mounting substrate 21 side.

The following advantageous effects are obtained by configuring the bearing holder 150 as described above.

1. Because the bearing holder 150 has the thick portion 151, the strength of the bearing holder 150 can be enhanced. In addition, because the thick portion 151 is attached simply by being press-fit inside the casing 10, the number of manufacturing steps can be reduced.

2. By making the opening size of the recess 153 larger than the connector component 22, which is made possible by indenting, from the component mounting substrate 21 side, the peripheral part of the terminal through-holes 503 in the bearing holder 150, the connector component 22 can be made to sink partially inside the recess 153. Accordingly, in comparison with the first embodiment, the overall height of the rotating electrical device 101 can be miniaturized. Furthermore, an adequate distance between members can be secured for the power supply terminals 41b and bearing holder 150, and the insulation properties between the power supply terminals 41b and bearing holder 150 are improved.

MODIFIED EXAMPLE

Embodiments of the present invention have been described hereinabove, but it goes without saying that the present invention is not limited to the foregoing embodiments alone, rather, various additional modifications can be made.

Moreover, although the rotating electrical device 100, which is used in a vehicle electric power steering apparatus, has been described as an example of an electronic device in the foregoing embodiments, the present invention is also applicable to rotating electrical devices (motors) for other purposes. In addition, the electronic device according to the present invention can be applied not only to a motor but also to other rotating electrical devices such as generators, and is also applicable to other electronic devices other than rotating electrical devices.

What is claimed is:

1. A rotating electrical device, comprising:
a rotor that has a shaft;
a stator which is disposed opposite the rotor in a radial direction and has a plurality of coils;
a bearing holder which supports a bearing supporting the shaft; and
a busbar unit which is disposed between the stator and the bearing holder,
wherein the bearing holder has a plurality of terminal through-holes, the busbar unit has a plurality of busbars formed of a conductive material, and an electrically insulating busbar holder enclosing the plurality of busbars,
wherein the plurality of busbars are electrically connected to the plurality of coils, respectively, and inserted through each of the plurality of terminal through-holes in the bearing holder, and
wherein the busbar holder encloses the periphery of a part where the plurality of busbars are inserted through the terminal through-holes.

2. The rotating electrical device according to claim 1, wherein the busbar holder comprises a base portion; a plurality of insertion portions which are each formed to protrude from the base portion, which individually hold the plurality of busbars, and which are each inserted into the plurality of terminal through-holes; and a reinforcing rib formed through extension in a direction orthogonal to the plurality of insertion portions.

3. The rotating electrical device according to claim 1, wherein the bearing holder comprises:
a thick portion which extends in a direction orthogonal to the shaft; and
a thin portion having a thinner thickness than the thick portion, and
wherein the plurality of terminal through-holes are formed in the thin portion.

4. The rotating electrical device according to claim 2, wherein the bearing holder comprises:
a thick portion which extends in a direction orthogonal to the shaft; and
a thin portion having a thinner thickness than the thick portion, and
wherein the plurality of terminal through-holes are formed in the thin portion.

5. The rotating electrical device according to claim 3, wherein the thin portion is formed on a busbar unit side in a thickness direction of the bearing holder.

6. The rotating electrical device according to claim 4, wherein the thin portion is formed on the busbar unit side in the thickness direction of the bearing holder.

* * * * *